United States Patent Office

Re. 27,687
Reissued June 26, 1973

27,687

QUENCHING THE FLUOROESCENCE OF OPTICAL BRIGHTENER COMPOUNDS IN PAPER BY MEANS OF HYDROXYMETHYLAMINO NITRILE

Donald V. Speese, Moorestown, N.J., and Chester B. Brown, Broadview, Ill., assignors to Ciba-Geigy Corporation, Ardsley, N.Y.

No Drawing. Original No. 3,542,642, dated Nov. 24, 1970, Ser. No. 709,782, Mar. 1, 1968. Application for reissue June 1, 1972, Ser. No. 258,676
Int. Cl. D21d *3/00*
U.S. Cl. 162—158 6 Claims

Matter enclosed in heavy brackets [ ] appears in the original patent but forms no part of this reissue specification; matter printed in italics indicates the additions made by reissue.

ABSTRACT OF THE DISCLOSURE

The fluorescent effect of optical brightener compounds on substrates employed in paper making is effectively quenched by the application to the substrate of from about one-quarter part to about 5 parts by weight, for every part of optical brightener compound present, of the compound hydroxymethylamino [aceto]nitrile from an aqueous solution.

BACKGROUND OF THE INVENTION

This invention relates to a composition and process for quenching the brightening effect of optical brightener agents contained in materials used in making paper. Such agents are routinely added in the production of a large proportion of the printing paper produced in order to enhance the bright appearance of the paper.

It is, however, often desirable to neutralize or "quench" the brightening effect of the optical brighteners present on the fibers of pulp, rag, clay, starch and/or in the solutions used in the paper making process.

Such is the case when it is required to change a run from one grade of paper to another when the specifications for the second paper call for a lesser degree of brightening effect.

An adjustment in the strength of the optical brightener content of materials is also frequently necessary in order to reproduce desired shades in paper which is to be colored with dyes or pigments.

The paper industry, for a considerable period of time, has been seeking a satisfactory means of quenching any optical brightening agent present on materials which are used in the making of paper, but without appreciable success.

It is essential, of course, that any agent and process for quenching the optical brightening agent do not in themselves impart any deleterious qualities to the paper such as loss of strength or changes of color by reaction with dyes or other chemicals used in the paper finishing process.

The industry need for a successful means for quenching the fluorescence of optical brighteners in printing paper was intensified when the U.S. Government Printing Office recently required that all paper used by the government in public printing and binding shall not have any fluorescent (optical) brighteners added to the pulp or paper during manufacture. Fluorescence due to residual white water, broke, or natural fibers is permissible, provided it does not exceed 2% when measured with or without the ultraviolet component of a light source of 3100° Kelvin in combination with a C.I.E. (International Commission of Illumination) Z (blue) filter.

The term "optical brightener agent" as used by the paper making industry and in this application means any chemical compound, which when added to the fiber or other material comprising the paper, or used in its manufacture, increases the apparent brightness of the paper over the normal brightness of the paper without the optical brightener agent present thereon.

Examples of brightening agents employed by the paper industry are: bis-triazinylaminostilbene compounds, coumarin derivatives, monoaminostilbenemonosulfonic acid triazole derivatives, pyrazole derivatives, and the like.

It is essential that any composition and method for quenching optical brighteners be inexpensive, that the composition be easily applied and that the amount of composition applied not be highly critical.

The composition and process of this invention provide means for quenching the fluorescence of optical brightener agents in pulp, clay coatings, or starch solutions and the like employed in the manufacture of paper, rapidly and without imparting undesirable characteristics to the paper. The method is simple and inexpensive. Rapid changes from a run of fluorescent paper to non-fluorescent paper with a minimum of "down-time" and waste of material are among the advantages flowing from this invention.

THE INVENTION

The effective quenching of optical brightener agents present on paper making materials or in solutions used in the paper making process is accomplished by adding to such materials or solutions a minor amount of the compound hydroxymethylamino [aceto]nitrile (hydroxymethylamino[methyl] cyanide). This compound which is a powder may be prepared by various methods known to those skilled in the art, for instance, by the reaction of one mole of hydrogen cyanamide with one mole of formaldehyde.

The particular optical brightener which is on the substrate to be treated does not have any appreciable effect on the success of the process of this invention. Experience indicates that the composition and process of this invention are useful with all types of known optical brightening agents.

The amount of hydroxymethylamino [aceto]nitrile required to effectively quench the fluorescence of the optical brightener present will, of course, vary somewhat with the particular optical brightener present on the material. It has been found in actual paper mill practice with a large number of varied brightener compounds, however, that generally about two parts of hydroxymethylamino [aceto]nitrile to one part of the optical brightener usually quenches at least 80% of the optical brightener. It is apparent, of course, that in each instance, the degree of quenching required will depend on the desired fluorescent specifications for final product.

From a practical point of view, the hydroxymethylamino [aceto]nitrile, is usefully employed from about one-quarter part to about five parts by weight for every part of optical brightener compound present in the substrate treated which is meant to include the paper itself, pulp, clay, starch, rags, solutions used in the paper manufacture, or any other component in the paper manufacturing process which may include an optical brightener agent. At a ratio of 5 parts of hydroxymethylamino [aceto]nitrile to 1 part of optical brightener at least 95% quenching is assured in practically all instances. Throughout the specification, all parts are given by weight unless otherwise indicated.

One method for applying hydroxymethylamino [aceto]nitrile to the desired substrate is to first dissolve approximately one part of hydroxymethylamino [aceto]nitrile in 100 to 200 parts of water, with one-half to one part of glacial acetic acid added thereto to aid in forming a clear solution if necessary. The strength, of course, can be varied for the particular needs and the total amount of hydroxymethylamino [aceto]nitrile employed will depend on the amount of optical brightener present and degree of quenching desired.

A particularly preferred prepared composition containing hydroxymethylamino [aceto]nitrile suitable for extended storage and readily dilutable as desired for application comprises from 20 to 40 (preferably about 25) parts by wt. of hydroxymethylamino [aceto]nitrile, 60 to 40 parts by wt. of water, about 1 or 2 parts of a cationic dispersing agent such as lauryl trimethyl chloride, about 1 part of a thickener such as carboxymethylcellulose, and about 1 part of hydrocarbon solvents such as xylol, all of which are blended together into a white, creamy, slightly thixotropic dispersion.

In treating pulp, clay or a paper making solution with hydroxymethylamino [aceto]nitrile contained in the foregoing dispersion, the required amount of the dispersion is dissolved in a convenient amount of water. With slight agitation, from about 1 to 2 parts of glacial acetic acid for each 6 parts of the dispersion is added in order to assure the clarity of the solution.

In general, the quantity of dispersion used to obtain very satisfactory degrees of quenching will be in the order of about five or six parts of the dispersion to one part by weight of optical brightener present on the substrate to be treated.

In situations where the quantity of optical brightener present is unknown, approximately 0.5 part of the above dispersion, based on the weight of the substrate treated, may be added initially. If the desired degree of quenching is not obtained with the first application, additional dispersion can then be added in 0.5 part increments, based on the weight of the substrate until the proper degree of quenching is obtained.

The use of large excess amounts of the hydroxymethylamino [aceto]nitrile over the amount necessary to obtain effective quenching should be avoided since such excesses may tend to cause a slight yellowing of the substrate treated.

The great effectiveness of this invention in quenching the fluorescence of optical brighteners may be representatively illustrated as follows.

Broke having an optical brightener agent, 4,4'-bis[4-[3-sulfoanilino] - 6 - [bis(2-hydroxyethyl)-amino]-1,3,5-triazin - 2 - yl] - amino-stilbene-2,2'-disulfonic acid tetrasodium salt, content of 4.0% was treated with 2% hydroxymethylamino acetonitrile OWF and the original fluorescence was reduced by 95%. One part of glacial acetic acid for each part of hydroxymethylamino [aceto]nitrile was added to a cold water slurry (20% solids) just prior to addition to the broke.

The degree of fluorescence is determined by conventional methods of the art using a fluorometer such as Lumetron Model 402–E or any similar device.

According to this invention, the quenching agent of this can be added to quench optical brighteners present in a system component at any stage of the paper manufacture where an aqueous solution can normally be introduced. The point of introduction is well within the choice of those skilled in the art and the choice will vary with the specific mill operation involved.

Similar results have been obtained wherein the substrate treated contains various other optical brightener compounds. Typical examples of such compounds are other bis-triazinylaminostilbene brighteners, such as 4,4'-bis{[4-anilino-6-[N-2-hydroxyethyl-N-methyl-amino]-1,3,5-triazin-2-yl]-amino}-stilbene-2,2'-disulfonic acid disodium salt, 4,4'-bis[(6-anilino-4-morpholino-1,3,5-triazin-2-yl)-amino]-stilbene-2,2'-disulfonic acid disodium salt, 4,4'-bis[(4,6-dianilino-1,3,5-triazin-2-yl)-amino]-stilbene-2,2'-disulfonic acid disodium salt;

monoaminostilbenemonosulfonic acid triazole compounds such as

2(4-styryl-3-N[3(dimethylamino)propyl]-sulfonamido phenyl)-2H-naphto[1,2-d]triazole, 2(4-styryl-3-sulfophenyl)-2H-naphto[1,2-d]triazole-7-sulfonic acid disodium salt, 2(4-styryl-3-sulfophenyl)-2H-naphto[1,2-d]triazole phenolester, 2[3-cyano-4-(4-chlorostyryl)phenyl]-2H-naphto[1,2-d] triazole;

coumarin derivatives such as 7-carbethoxyamino-3-phenyl-coumarin, 7-(2-chloro-6-diethylamino-1,3,5-triazin-4-yl)-amino-3-phenylcoumarin; and pyrazole derivatives such as 3-(4-chlorophenyl)-5-phenyl-1-(4-sulfophenyl)-pyrazoline; and many other optical brightener compounds used generally by the paper making industry.

While the invention has been explained by detailed description of certain specific embodiments, it is understood that various modifications and substitutions can be made in any of them within the scope of the appended claims which are intended also to include equivalents of such embodiments.

What is claimed is:

1. A method for quenching the fluorescent effect of optical brightener compounds present in a substrate used in a paper-making process which comprises applying to said substrate from about one-quarter part to about 5 parts of hydroxymethylamino [aceto]nitrile for each part of optical brightener compound in a substrate, all parts being by weight.

2. A method as claimed in claim 1 wherein about 2 parts of said hydroxymethylamino [aceto]nitrile are applied for each part of optical brightener compound present in said substrate.

3. A composition of matter for quenching optical brightener fluorescence, said composition comprising from about 20% to about 40% of hydroxymethylamino [aceto]nitrile, from about 0.5% to about 4.0% of a cationic dispersing agent, from about 0.5% to about 3% of a thickener, from about 0.5% to about 3% of an aromatic hydrocarbon solvent, the balance water, all percentages being based on the total weight of the composition.

4. A composition as claimed in claim 3 comprising about 25% of hydroxymethylamino [aceto]nitrile, about 1% lauryl trimethyl chloride, about 1% carboxymethylcellulose, about 1% xylol, and the balance water.

5. A method for quenching the fluorescent effect of optical brightener compounds present in a substrate used in making paper which comprises mixing about 6 parts of the composition of claim 3 with about 1 part of glacial acetic acid to form a clear solution and then applying said solution to the substrate in sufficient quantity to provide from about 5 to about 6 parts of the composition of claim 3 for each part by weight of optical brightener compound present in the substrate.

6. A method for quenching the fluorescent effect of optical brightener compounds present in a substrate used in making paper which comprises mixing about 6 parts of the composition of claim 4 with about 1 part of glacial acetic acid to form a clear solution and then applying said solution to the substrate in sufficient quantity to provide from about 5 to about 6 parts of the composition of claim 4 for each part by weight of optical brightener compound present in the substrate.

References Cited

The following references, cited by the Examiner, are of record in the patented file of this patent or the original patent.

UNITED STATES PATENTS

| | | | |
|---|---|---|---|
| 3,175,980 | 3/1965 | Daglish et al. | 117—33.5 X |
| 3,479,349 | 11/1969 | Allison et al. | 162—162 X |

S. LEON BASHORE, Primary Examiner

A. L. CORBIN, Assistant Examiner

U.S. Cl. X.R.

8—1; 117—33.5; 162—136, 162, 164